US011281433B2

(12) United States Patent
Berzati et al.

(10) Patent No.: US 11,281,433 B2
(45) Date of Patent: Mar. 22, 2022

(54) METHOD FOR GENERATING A PRIME NUMBER BY TESTING CO-PRIMALTY BETWEEN A PRIME CANDIDATE AND A PREDETERMINED PRIME NUMBER IN A BINARY BASE

(71) Applicant: THALES DIS FRANCE SA, Meudon (FR)

(72) Inventors: Alexandre Berzati, Meudon (FR); Myléne Roussellet, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 52 days.

(21) Appl. No.: 16/486,904

(22) PCT Filed: Feb. 9, 2018

(86) PCT No.: PCT/EP2018/053247
§ 371 (c)(1),
(2) Date: Aug. 19, 2019

(87) PCT Pub. No.: WO2018/153684
PCT Pub. Date: Aug. 30, 2018

(65) Prior Publication Data
US 2020/0057611 A1    Feb. 20, 2020

(30) Foreign Application Priority Data

Feb. 21, 2017 (EP) ..................................... 17305191

(51) Int. Cl.
*G06F 7/72* (2006.01)
*H04L 9/00* (2022.01)
*H04L 9/30* (2006.01)

(52) U.S. Cl.
CPC ................ *G06F 7/72* (2013.01); *H04L 9/002* (2013.01); *H04L 9/3033* (2013.01); *G06F 2207/7204* (2013.01)

(58) Field of Classification Search
CPC ... G06F 7/72; G06F 2207/7204; H04L 9/3033
See application file for complete search history.

(56) References Cited

U.S. PATENT DOCUMENTS 6,445,797 B1 * 9/2002 McGough ............. H04L 9/0631
380/262
2002/0186837 A1    12/2002 Hopkins et al.
(Continued)

OTHER PUBLICATIONS

Joye M et al., "Efficient Generation of Prime Numbers" pp. 340-354. (Year: 2000).*

(Continued)

*Primary Examiner* — Chuong D Ngo
(74) *Attorney, Agent, or Firm* — The Jansson Firm; Pehr B. Jansson

(57) ABSTRACT

The present invention relates to a method for generating a prime number and using it in a cryptographic application, comprising the steps of: a) determining at least one binary base B with a small size $b=\log_2(B)$ bits and for each determined base B at least one small prime $p_i$ such that B mod $p_i=1$, with i an integer, b) selecting a prime candidate $Y_P$, c) decomposing the selected prime candidate $Y_P$ in a base B selected among said determined binary bases : $Y_P=\Sigma y_j B^j$ d) computing a residue $y_{PB}$ from the candidate $Y_P$ for said selected base such that $y_{PB}=\Sigma y_j$ e) testing if said computed residue $y_{PB}$ is divisible by one small prime pi selected among said determined small primes for said selected base B, f) while said computed residue $y_{PB}$ is not divisible by said selected small prime, iteratively repeating above step e) until tests performed at step e) prove that said computed residue $y_{PB}$ is not divisible by any of said deter- (Continued)

mined small primes for said selected base B, g) when said computed residue $y_{PB}$ is not divisible by any of said determined small primes for said selected base B, iteratively repeating steps c) to f) for each base B among said determined binary bases, h) when, for all determined bases B, said residue $y_{PB}$ computed for a determined base is not divisible by any of said determined small primes for said determined base B, executing a known rigorous probable primality test on said candidate $Y_P$, and when the known rigorous probable primality test is a success, storing said prime candidate $Y_P$ and using said stored prime candidate $Y_P$ in said cryptographic application.

12 Claims, 2 Drawing Sheets

(56) References Cited

U.S. PATENT DOCUMENTS

| | | | |
|---|---|---|---|
| 2009/0319804 A1* | 12/2009 | Qi | H04L 9/302 |
| | | | 713/190 |
| 2011/0142231 A1* | 6/2011 | Takeda | G06F 7/72 |
| | | | 380/30 |
| 2014/0358980 A1* | 12/2014 | Feix | G06F 17/11 |
| | | | 708/446 |

OTHER PUBLICATIONS

Marc Joye et al., "Fast Generation of Prime Numbers on Portable Devices: An Update", pp. 160-173. (Year: 2006).*

PCT/EP2018/053247, International Search Report, dated Feb. 27, 2018, European Patent Office, P.B. 5818 Patentlaan 2 NL-2280 HV Rijswijk.

PCT/EP2018/053247, International Search Report, dated Feb. 27, 2018, European Patent Office, D-80298 Munich, Germany.

* cited by examiner

METHOD FOR GENERATING A PRIME NUMBER BY TESTING CO-PRIMALTY BETWEEN A PRIME CANDIDATE AND A PREDETERMINED PRIME NUMBER IN A BINARY BASE

FIELD OF THE INVENTION

The present invention relates to the field of prime number generation for a cryptographic application, and of associated cryptographic devices, and more particularly to a fast prime number generation using a co-primality test that does not require any GCD calculation.

BACKGROUND OF THE INVENTION

Cryptographic applications such as encryption or cryptographic key generation often rely on prime numbers. Consequently, devices performing such cryptographic applications, such as secure devices like smartcards, have to generate prime numbers, which is one of the most resource consuming operation embedded on such devices. Primality of a candidate number is often tested using a rigorous probable primality test such as the Miller-Rabin test. Such a test being very costly, candidates can be eliminated beforehand by testing their co-primality with a few known small prime numbers.

Such co-primality tests are often based on Great Common Divisor (GCD) calculation. Nevertheless, such a GCD calculation can be itself quite costly, especially for devices with limited processing capabilities and/or CPUs that do not include any fast divider. GCD calculation in the frame of a cryptographic application may also induce a security risk since GCD calculation leakage can be exploited for retrieving secret keys such as RSA private keys.

Consequently there is a need for cryptographic applications and associated devices able to generate prime numbers securely and with limited processing power requirements, without requiring GCD calculations.

SUMMARY OF THE INVENTION

For this purpose and according to a first aspect, this invention therefore relates to a method for generating a prime number and using it in a cryptographic application, comprising the steps of:
a) determining, via a processing system comprising at least one hardware processor, a test primality circuit and a memory circuit, at least one binary base B with a small size $b=\log_2(B)$ bits and for each determined base B at least one small prime $p_i$ such that B mod pi=1, with i an integer,
b) selecting, via said hardware processor, a prime candidate $Y_P$,
c) decomposing, via said hardware processor, the selected prime candidate $Y_P$ in a base B selected among said determined binary bases: $Y_P = \Sigma y_j B_j$,
d) computing, via said hardware processor, a residue $y_{PB}$ from the candidate $Y_P$ for said selected base such that $y_{PB} = \Sigma y_j$,
e) testing, via said test primality circuit, if said computed residue $y_{PB}$ is divisible by one small prime pi selected among said determined small primes for said selected base B,
f) while said computed residue $y_{PB}$ is not divisible by said selected small prime, iteratively repeating, via said test primality circuit, above step e) until tests performed at step e) prove that said computed residue $y_{PB}$ is not divisible by any of said determined small primes for said selected base B,
g) when tests performed at step e) have proven that said computed residue $y_{PB}$ is not divisible by any of said determined small primes for said selected base B, iteratively repeating steps c) to f) for each base B among said determined binary bases,
h) when, for all determined bases B, tests performed at step e) have proven that said residue $y_{PB}$ computed for a determined base is not divisible by any of said determined small primes for said determined base B, executing, via said test primality circuit, a known rigorous probable primality test on said candidate $Y_P$, and when the known rigorous probable primality test is a success, storing said prime candidate $Y_P$ in said memory circuit and using, via a cryptographic processor, said stored prime candidate $Y_P$ in said cryptographic application.

This enables to test efficiently the co-primality of a candidate prime with multiple prime numbers, without computing any GCD between this candidate prime and the multiple prime numbers; and finally to determine at a lower cost a prime number for then using it in a cryptographic application.

The method according to the first aspect may comprise:
in step f) when said computed residue $y_{PB}$ is divisible by said selected small prime, iteratively repeating, via said test primality circuit, above step e) until said computed residue $y_{PB}$ divisibility has been tested against all said determined small primes for said selected base B,
in step g) when said computed residue $y_{PB}$ is divisible by one of said determined small primes for said selected base B and said computed residue $y_{PB}$ divisibility has been tested against all said determined small primes for said selected base B, iteratively repeating steps c) to f) for each base B among said determined binary bases.

This enables to make constant the execution time of the testing process of a candidate prime number, should it be a prime number or not.

The method according to the first aspect may comprise the step:
i) when said computed residue $y_{PB}$ is divisible by a selected small prime, or when the known rigorous probable primality test is a failure, iteratively repeating steps d) to h) for new prime candidates until said known rigorous probable primality test is a success, wherein, for a new prime candidate $Y_P$ and a selected base B, said residue $y_{PB}$ is computed by incrementing by a predetermined increment a residue previously computed for another prime candidate and said selected base B.

After a candidate prime has been discarded, it enables to keep testing new candidate prime numbers until a prime number is finally found.

Using said stored prime candidate $Y_P$ in said cryptographic application may comprise at least one of executing, via said cryptographic processor, said cryptographic application to secure data using said stored prime candidate $Y_P$, and/or generating, via said cryptographic processor, a cryptographic key using said stored prime candidate $Y_P$.

The sum computation for the residue computation may be performed in a random order.

Using a random order enables to avoid leaking information to an attacker about the candidate prime to be tested.

Said bases may be determined so as to maximize the number of different determined small primes.

It enables to maximize the chances of detecting that the candidate prime is not a prime number before performing the rigorous probable primality test without increasing the number of determined bases and therefore the number of decompositions of the candidate prime to be performed.

Said bases may be determined based on a word size of the processing system.

Such a way of determining bases increases the efficiency of the implementation of the steps of the method.

Testing if said computed residue $y_{PB}$ is divisible by one small prime $p_i$ may be performed using Barrett modular reduction.

Such a reduction replaces word division operation by a multiplication operation, and therefore reduces the cost of such a test.

For a determined base B, said determined small primes $p_i$ may comprise all primes between 3 and 541 such that B mod $p_i$=1.

Choosing such small values for the determined primes lowers the cost of testing if the sum of the prime candidate words when the prime candidate is decomposed in base B is divisible by a determined prime number.

Said determined binary bases may have sizes among 16, 24, 28, 32, 36, 44, 48, 52, 60, 64.

Said known rigorous probable primality test may comprise a Miller-Rabin test or a Fermat test.

According to a second aspect, this invention relates to a computer program product directly loadable into the memory of at least one computer, comprising software code instructions for performing the steps of the method according to the first aspect, when said product is run on the computer.

According to a third aspect, this invention relates to a non-transitory computer readable medium storing executable computer code that when executed by a cryptographic device comprising a processing system and a cryptographic processor performs the method according to the first aspect.

According to a fourth aspect, this invention relates to a cryptographic device comprising:
 a processing system having at least one hardware processor, a test primality circuit and a memory circuit configured for storing said prime candidate $Y_P$,
 a cryptographic processor,
said processing system and cryptographic processor being configured to execute the steps of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

In the description below, notations under the form x^y and $x^y$ are both used for the exponentiation operation.

The invention aims at providing a method for a cryptographic application, and an associated cryptographic device, comprising a fast prime number generation without any GCD calculation.

Figure 1:
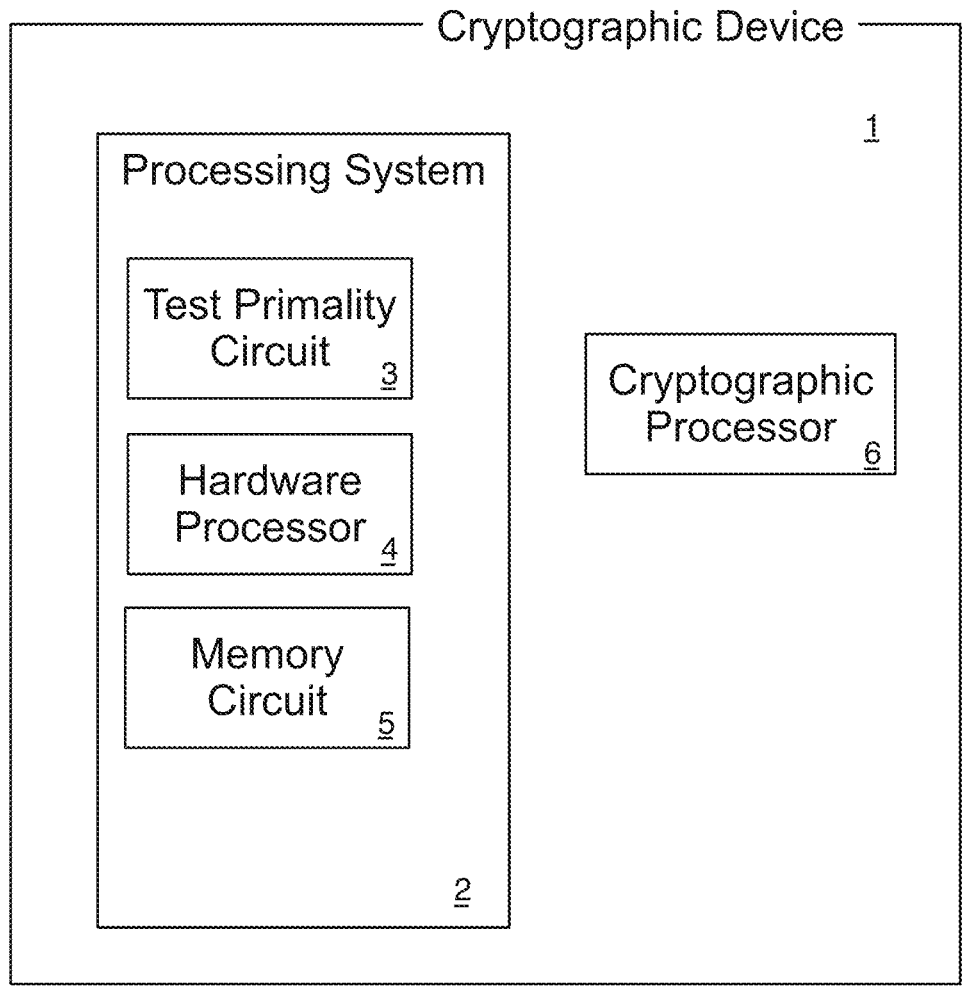
FIG. 1 is a schematic illustration of a cryptographic device according to an embodiment of the present invention.

According to a first aspect, the invention relates to such a cryptographic device as depicted on FIG. 1. Such a cryptographic device 1 may comprise a processing system 2 configured to generate prime numbers. The processing system 2 may comprise a test primality circuit 3, testing the co-primality of candidate prime numbers with known small prime numbers according to the method described here below. It may also comprise a hardware processor 4 performing the other processing tasks required to generate a prime number in said method, and a memory circuit 5 storing at least the generated prime numbers.

Such a cryptographic device may also include a cryptographic processor 6 performing cryptographic applications such as secret key generation based on the prime numbers generated by the processing system 2.

The hardware processor 4 of the processing system 2 and the cryptographic processor 6 may be separated or may be a unique common processor used both for prime number generation and cryptographic application.

According to a second aspect, the invention relates to a method generating a prime number and using it in a cryptographic application, performed by such a cryptographic device 1. In order to generate a prime number with a limited resource consumption, said method uses co-primality tests against known small primes numbers, as existing methods do. But instead of computing GCDs for performing such co-primality tests, the method according to the invention takes advantage of a particular mathematical property of some prime numbers, as described in the following paragraphs.

Let us consider a binary base B of size $b=\log_2(B)$ and a prime candidate $Y_P$. The prime candidate $Y_P$ can be expressed in base B as $Y_P=\Sigma y_j B^j$. Checking the co-primality of the prime candidate $Y_P$ with a prime number $p_i$ is equivalent to test if $Y_P$ is divisible by $p_i$, i.e. to test if $Y_P$ mod $p_i$=0 or not.

$Y_P$ mod $p_i$ may be expressed under a different form using the following formula: $Y_P$ mod $p_i$=($\Sigma y_j B^j$) mod $p_i$=($\Sigma y_j$(B mod $p_i)^j$) mod $p_i$ It appears that for some binary bases, there exists one or more prime numbers $p_i$ such that $B$ mod $p_i=1$. In that case $Y_P$ mod $p_i$ may be expressed as $Y_P$ mod $p_i = \Sigma y_j$ mod $p_i$. Consequently, testing if $Y_P$ is divisible by a prime number $p_i$ such that $B$ mod $p_i=1$, can be achieved by just computing the sum of $Y_P$ words when $Y_P$ is decomposed in base $B$, and then testing if this sum is divisible by such a prime number $p_i$.

As a result, co-primality between a prime candidate and prime numbers verifying the property $B$ mod $p_i=1$ for some binary base can be tested much faster by such a sum computation than by computing a GCD between said prime candidate and said prime number.

Figure 2:
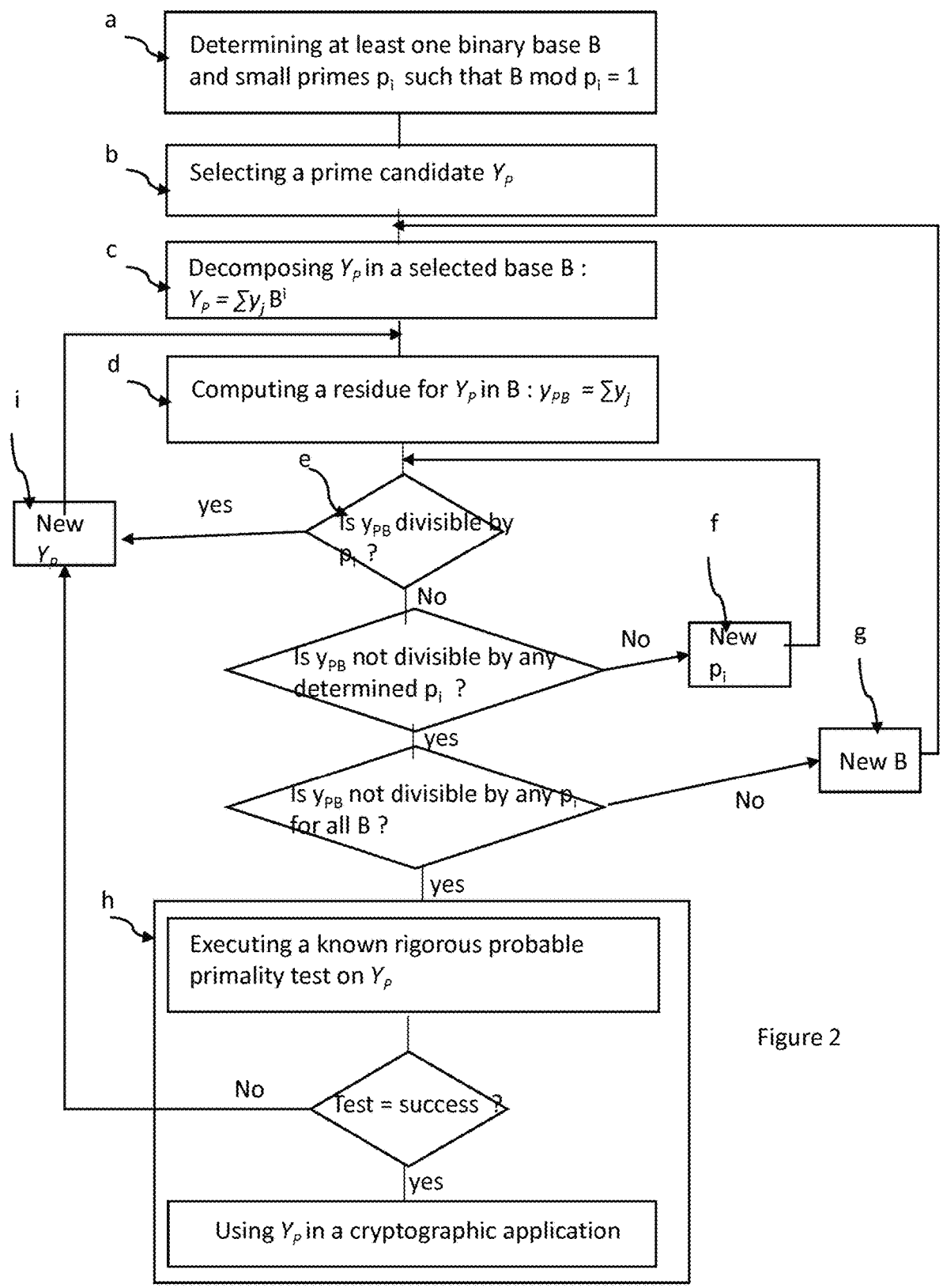
FIG. 2 illustrates schematically a method for generating a prime number and using it in a cryptographic application according to an embodiment of the present invention.

In order to generate a prime number in a way taking advantage of such a property and to use it in a cryptographic application, the method according to the second aspect of the invention may include the steps described here under and depicted on FIG. 2.

In a determining step a), the processing system 2 may determine at least one binary base $B$ with a small size $b=\log_2(B)$ bits and for each determined base $B$ at least one small prime $p_i$ such that $B$ mod $p_i=1$, with i an integer.

In a first embodiment, during the determining step a) the processing system may perform calculations in order to verify for various bases which prime numbers verify $B$ mod $p_i=1$ and select at least one binary base $B$ and at least one small prime $p_i$ for which the processing system has verified that $B$ mod $p_i=1$.

In a second embodiment, such a verification may be performed before the determining step a) is performed, possibly by another system than the processing system 2, and the bases $B$ and small primes $p_i$ such that $B$ mod $p_i=1$ may be stored in the memory circuit of the processing system 2. In that case, during the determining step a) the processing system simply reads in the memory circuit the stored bases $B$ and the small primes associated to each one of the bases $B$.

As shown here above, thanks to the property $B$ mod $p_i=1$ the co-primality of a prime candidate with each of the determined primes can be determined at a much lower cost than the cost of a GCD calculation between the prime candidate and such a determined prime, by just computing the sum of the prime candidate words when the prime candidate is decomposed in base $B$, and then testing if this sum is divisible by such a prime number $p_i$.

As an illustrative example, the determined binary bases may have sizes b among 16, 24, 28, 32, 36, 44, 48, 52, 60 and 64. The bases may be determined based on a word size of the processing system.

In an embodiment, the binary bases are determined so as to maximize the number of different determined small primes. It is desirable to limit the number of bases $B$ for which the co-primality of a prime candidate with at least one prime verifying $B$ mod $p_i=1$ is tested. Such a test indeed requires to decompose the prime candidate in each base $B$, which has some cost. Unfortunately different binary bases $B$ may have in common one or more prime numbers verifying $B$ mod $p_i=1$. Consequently in order to be able to test the co-primality of a prime candidate with as many primes as possible for a given number of binary bases $B$, the binary bases $B$ may be carefully selected so as to maximize the number of determined primes verifying $B$ mod $p_i=1$ for the selected bases.

As the probability that the prime candidate is divisible by a prime number decreases as this prime number increase, the divisibility of the candidate prime number by the smallest prime numbers shall be tested first. As an example, for a determined base $B$, said determined small primes $p_i$ may comprise the one hundred first prime numbers, i.e. all primes between 3 and 541, such that $B$ mod $p_i=1$.

As another example, the determined small primes associated to said determined binary bases with a size b between 16 and 32 may be among the following values:
- −3, 5, 17, 257 for b=16,
- −3, 7, 19, 73 for b=18,
- −3, 5, 11, 31, 41 for b=20,
- −7, 127, 337 for b=21,
- −3, 23, 89, 683 for b=22,
- −47 for b=23,
- −3, 5, 7, 13, 17, 241 for b=24,
- −31, 601, 1801 for b=25,
- −3, 2731 for b=26,
- −7, 73 for b=27,
- −3, 5, 29, 43, 113, 127 for b=28,
- −233, 1103, 2089 for b=29,
- −3, 7, 11, 31, 151, 331 for b=30,
- −3, 5, 17, 257 for b=32.

In a selection step b) the hardware processor 4 of the processing system 2 may select a prime candidate $Y_P$.

In a decomposition step c) the hardware processor may decompose the selected prime candidate $Y_P$ in a base $B$ selected among said determined binary bases: $Y_P = \Sigma y_j B^i$.

Then in a computing step d), the hardware processor may compute a residue $y_{PB}$ from the candidate $Y_P$ for said selected base $B$ such that $y_{PB} = \Sigma y_j$. As expressed by this formula, such a residue is the sum of $Y_P$ words when $Y_P$ is decomposed in the selected base $B$. In order to avoid leaking information to an attacker, the sum computation for the residue computation may be performed in a random order.

Then in a testing step e), the test primality circuit 3 tests if said computed residue $y_{PB}$ is divisible by one small prime $p_i$ selected among said determined small primes for said selected base $B$. Since the selected small prime $p_i$ and the selected base $B$ verify $B$ mod $p_i=1$, such a test on the residue is equivalent to testing if the candidate prime $Y_P$ is coprime with the selected small prime $p_i$.

When the result of the testing step e) is that the residue $y_{PB}$ is not divisible by the selected small prime $p_i$, it means that the candidate prime $Y_P$ is coprime with the selected small prime $p_i$. In that case, the candidate prime $Y_P$ is still a valid candidate prime number and the co-primality of the candidate prime $Y_P$ with the other small primes selected for the base $B$ should be tested.

The method may then include a first repetition step f) during which the test primality circuit may iteratively repeat above step e) while said computed residue $y_{PB}$ is not divisible by said selected small prime until tests performed at step e) prove that said computed residue $y_{PB}$ is not divisible by any of said determined small primes for said selected base $B$. By doing so, at each repetition of the testing step e) the divisibility of the computed residue $y_{PB}$ by a new small prime $p_i$ selected among said determined small primes for said selected base $B$ is tested. The co-primality of the candidate prime $Y_P$ with the small primes $p_i$ determined for the selected base $B$ is thus tested one small prime after the other, until the candidate prime $Y_P$ is found divisible by one of the determined small primes, and is therefore not a prime number, or until the candidate prime $Y_P$ is found coprime with all the small primes $p_i$ selected for the base $B$.

When tests performed at step e) have proven that said computed residue $y_{PB}$ is not divisible by any of said determined small primes for said selected base $B$, the candidate prime $Y_P$ is still a valid candidate prime number and the co-primality of the candidate prime $Y_P$ with other small primes, verifying B mod $p_i=1$ with other bases, should be tested. The method may then include a second repetition step g) during which steps c) to f) are iteratively repeated for each base B among said determined binary bases. By doing so, at each iteration of the decomposition step c) and the computing step d) the prime candidate is decomposed on a new base B among the determined binary bases and its residue is computed for this new base. Steps e) and f) then enable to test the co-primality of the candidate prime $Y_P$ with the small primes $p_i$ determined for the new selected base B one small prime after the other.

When, for all determined bases B, tests repeatedly performed at step e) have proven that said residue $y_{PB}$ computed for a determined base is not divisible by any of said determined small primes for said determined base, the candidate prime $Y_P$ is co-prime with all the determined small primes for all the determined bases. The method may then include an execution step h) during which the test primality circuit executes a known rigorous probable primality test on said candidate $Y_P$. Such a rigorous probable primality test may be for example a Miller-Rabin test or a Fermat test.

When the known rigorous probable primality test is a success, the execution step h) may also comprise storing the prime candidate $Y_P$ in the memory circuit 5 of the processing system 2, and using, via a cryptographic processor 6, said stored prime candidate $Y_p$ in said cryptographic application.

As an example, using said stored prime candidate $Y_p$ in a cryptographic application may comprise at least one of executing, via said cryptographic processor, said cryptographic application to secure data using said stored prime candidate $Y_P$, and/or generating, via said cryptographic processor, a cryptographic key using said stored prime candidate $Y_P$.

Steps a) to h) described above thus enable to test efficiently the co-primality of a prime candidate against multiple small prime numbers at a reduced cost, without computing any GCD between the prime candidate and said small prime numbers.

In order to reduce even more the cost of the co-primality tests performed in the testing step e) testing if said computed residue $y_{PB}$ is divisible by one small prime pi may be performed using Barrett modular reduction. Such a reduction indeed replaces word division by a multiplication operation which often has a much lower cost.

At some iteration of the testing step e), the computed residue $y_{PB}$ may be found divisible by a selected small prime $p_i$. At the execution step h), the known rigorous probable primality test may also be a failure. In both cases, the tested prime candidate is actually not a prime number. It is desirable then to test a new candidate prime number. The method may then include a third repetition step i) during which steps d) to h) are iteratively repeated for new prime candidates until said known rigorous probable primality test is a success. For such a new prime candidate, a residue of the new prime candidate is needed eventually for each determined base B.

In a first embodiment, such a residue may be computed by decomposing the new prime candidate in each base, as in the decomposing step c) and computing the sum of the words of the new candidate prime expressed in each base, as explained hereabove.

In a second embodiment, for a new prime candidate $Y_P$ and a selected base B, the residue $y_{PB}$ may be computed by incrementing by a predetermined increment a residue previously computed for another former prime candidate and said selected base B. Such a predetermined increment shall be equal to the sum of the words of the difference, expressed in said selected base B, between the former prime candidate and the new prime candidate. Doing so enables to compute the residue by decomposing in the selected base B only the difference between the two candidate prime numbers, which could be small, instead of decomposing the whole new prime candidate, which could be costly.

When in the testing step e/the computed residue $y_{PB}$ is found divisible by the selected small prime, the prime candidate is actually not a prime number. In a first embodiment, the method may then stop or jump to the third repetition step i/described above in order to test a new candidate prime. This has the drawback of letting an attacker monitoring the execution of the method know that the tested candidate prime is not a prime number just by looking at the execution time.

Therefore in a second embodiment, co-primality with all the determined small primes for all the determined bases is tested whatever the results of the tests performed at the testing step e). In order to do so:

in the first repetition step f) when said computed residue $y_{PB}$ is divisible by said selected small prime, the test primality circuit may iteratively repeat above step e) until said computed residue $y_{PB}$ divisibility has been tested against all said determined small primes for said selected base B, and, when said computed residue $y_{PB}$ is divisible by one of said determined small primes for said selected base B and said computed residue $y_{PB}$ divisibility has been tested against all said determined small primes for said selected base B, the second repetition step g) may include iteratively repeating steps c) to f) for each base B among said determined binary bases.

Doing so enables to have a constant execution time of steps e) to g) whatever the primality of the candidate prime.

According another aspect, the invention relates to a computer program product directly loadable into the memory of at least one computer, comprising software code instructions for performing the steps a) to h) described here above when said product is run on the computer.

According another aspect, the invention relates to a non-transitory computer readable medium storing executable computer code that when executed by a computing system comprising a processing system and a cryptographic processor performs the steps a) to h) described here above.

The invention claimed is:

1. A method for improving the efficiency of a cryptographic device having a processing system for generating a prime number and using the prime number in a cryptographic application, comprising the steps of:

a) determining, via the processing system (2) comprising at least one hardware processor (4), a test primality circuit (3) and a memory circuit (5), at least one binary base B with a size $b=\log_2(B)$ bits and for each determined base B, at least one prime $p_i$ such that B mod $p_i=1$, with i an integer, b) selecting, via said hardware processor (4), a prime candidate $Y_P$, c) decomposing, via said hardware processor, the selected prime candidate $Y_P$ in a base B selected among said at least one determined binary bases: $Y_P=\Sigma y_j B^j$ d) computing using a summation computation, via said hardware processor, a residue $y_{PB}$ from the candidate $Y_P$ for said selected base B such that $Y_{PB}=\Sigma y_j$ e) testing, via said test primality circuit (3), if said computed residue ypB is divisible by one prime $p_i$ selected among said at least one determined primes $p_i$ for said selected base B, f) while said computed residue $y_{PB}$ is not divisible by said selected one prime $p_i$, iteratively repeating, via said test primality circuit, above step e) until tests performed at step e) prove that said computed residue $y_{PB}$ is not divisible by any of said at least one determined primes $p_i$ for said selected base B, g) when tests performed at step e) have proven that said computed residue $y_{PB}$ is not divisible by any of said at least one determined primes $p_i$ for said selected base B, iteratively repeating steps c) to f) for each base B among said at least one determined binary bases, h) when, for said at least one binary base B, tests performed at step e) have proven that said residue $y_{PB}$ computed for a determined base is not divisible by any of said at least one determined primes $p_i$ for said determined base B, executing, via said test primality circuit, a rigorous probable primality test on said candidate $Y_P$, and when the rigorous probable primality test is a success, storing said prime candidate $Y_P$ in said memory circuit (5) and using, via a cryptographic processor (6), said stored prime candidate $Y_P$ in said cryptographic application, i) when said computed residue $y_{PB}$ is divisible by a selected prime, or when the rigorous probable primality test is a failure, iteratively repeating steps d) to h) for new prime candidates until said rigorous probable primality test is a success, wherein, for a new prime candidate $Y_P$ and a selected base B, said residue $y_{PB}$ is computed by incrementing by a predetermined increment a residue previously computed for another prime candidate and said selected base B.

2. The method of claim 1 comprising: in step f) when said computed residue $y_{PB}$ is divisible by said selected one prime $p_i$, iteratively repeating, via said test primality circuit, above step e) until said computed residue $y_{PB}$ divisibility has been tested against all said at least one determined primes $p_i$ for said selected base B, in step g) when said computed $y_{PB}$ is divisible by one of said at least one determined primes $p_i$ for said selected base B and said computed residue $y_{PB}$ divisibility has been tested against all said at least one determined primes $p_i$ for said selected base B, iteratively repeating steps c) to f) for each base B among said at least one determined binary bases.

3. The method of claim 1, wherein using said stored prime candidate $Y_P$ in said cryptographic application comprises at least one of executing, via said cryptographic processor (6), said cryptographic application to secure data using said stored prime candidate $Y_P$, and/or generating, via said cryptographic processor, a cryptographic key using said stored prime candidate $Y_P$.

4. The method of claim 1, wherein the summation computation for the residue computation is performed in a random order.

5. The method of claim 1, wherein said at least one determined binary base B are determined so as to maximize the number of different determined primes of the at least one determined small prime $p_i$.

6. The method of claim 1, wherein said bases are determined based on a word size of the processing system.

7. The method of claim 1, wherein testing if said computed residue $y_{PB}$ is divisible by the one prime $p_i$ is performed using Barrett modular reduction.

8. The method of claim 1, wherein, for a determined base B, said at least one determined primes pi comprise all primes between 3 and 541 such that B mod $p_i=1$.

9. The method of claim 1, wherein said at least one determined binary bases have sizes among 16, 24, 28, 32, 36, 44, 48, 52, 60, 64.

10. The method of claim 1, wherein said rigorous probable primality test comprises a Miller-Rabin test or a Fermat test.

11. A non-transitory computer readable medium storing executable computer code that when executed by a cryptographic device (1) comprising a processing system (2) and a cryptographic processor (6) performs the method according to the claim 1.

12. A cryptographic device (1) comprising: a processing system (2) having at least one hardware processor (4), a test primality circuit (3) and a memory circuit (5) configured for storing said prime candidate $Y_P$, a cryptographic processor (6), said processing system (2) and cryptographic processor (6) being configured to execute the steps of the method according to the claim 1.

\* \* \* \* \*